United States Patent [19]

Dangschat et al.

[11] Patent Number: 4,984,145
[45] Date of Patent: Jan. 8, 1991

[54] CIRCUIT ARRANGEMENT FOR FREE-RUNNING BLOCKING-OSCILLATOR TYPE SWITCHED POWER PACK

[75] Inventors: Rainer Dangschat, Landsham; Ernst Paulik, Hilgertshausen, both of Fed. Rep. of Germany

[73] Assignee: Siemens Aktiengesellschaft, Berlin and Munich, Fed. Rep. of Germany

[21] Appl. No.: 470,250

[22] Filed: Jan. 25, 1990

[30] Foreign Application Priority Data

Jan. 25, 1989 [DE] Fed. Rep. of Germany ....... 3902164

[51] Int. Cl.⁵ ........................................... H02M 3/338
[52] U.S. Cl. ..................................... 363/19; 363/21; 331/112
[58] Field of Search .......................... 363/19, 21, 97; 331/109, 112

[56] References Cited

U.S. PATENT DOCUMENTS

| | | | |
|---|---|---|---|
| 4,564,820 | 1/1986 | Peruth et al. | 331/112 |
| 4,593,347 | 6/1986 | Peruth et al. | 331/112 |
| 4,648,016 | 3/1987 | Peruth et al. | 363/21 |
| 4,688,159 | 8/1987 | Marinus | 363/19 |
| 4,740,880 | 4/1988 | Peruth | 363/21 |

FOREIGN PATENT DOCUMENTS

| | | |
|---|---|---|
| 0219736 | 10/1986 | European Pat. Off. |
| 2651196 | 5/1978 | Fed. Rep. of Germany. |
| 3223756 | 1/1984 | Fed. Rep. of Germany. |
| 3312209 | 10/1984 | Fed. Rep. of Germany. |
| 3602858 | 8/1987 | Fed. Rep. of Germany. |
| 3720197 | 12/1988 | Fed. Rep. of Germany. |
| 3733010 | 4/1989 | Fed. Rep. of Germany. |

OTHER PUBLICATIONS

Siemens Integrated Circuit TDA 4605.
Siemens "ICs fur die Unterhaltungs-Elektronik", p. 57, for Siemens Integrated Circuit TDA 4605.

Primary Examiner—William H. Beha, Jr.
Attorney, Agent, or Firm—Hill, Van Santen, Steadman & Simpson

[57] ABSTRACT

A circuit arrangement for a free running blocking oscillator type switched power pack includes a control means for pulse width modulated drive of an electrical switch element. The control means receives as controlled information, among other things a zero axis crossing detector signal at one input post and a control voltage and a further input post that is dependent upon the output voltage of the switched power pack. To guarantee reliable operation yet yield low power consumption, particularly during the standby mode, it is proposed that a detector means with whose assistance an internal reference voltage is reduced during standby mode be provided in addition to a capacitive coupling of the two input posts. The result is that the undesirable rise in the output voltage in the standby mode and the further boost by the capacitive coupling of the input posts is effectively avoided.

7 Claims, 2 Drawing Sheets

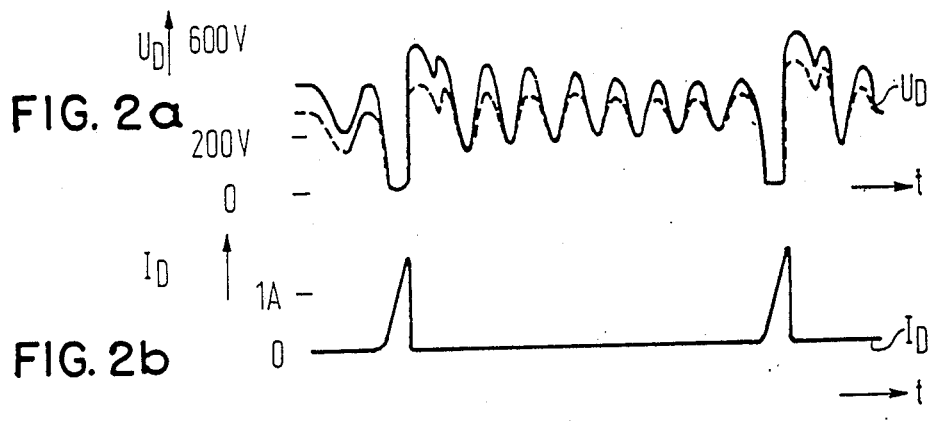
FIG. 2a
FIG. 2b
FIG. 2c
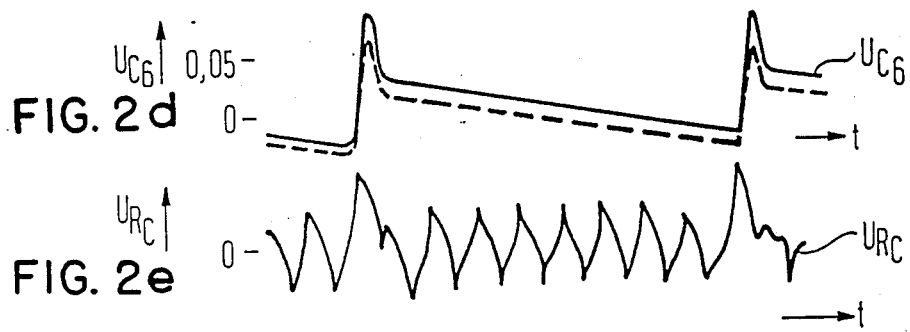
FIG. 2d
FIG. 2e

4,984,145

CIRCUIT ARRANGEMENT FOR FREE-RUNNING BLOCKING-OSCILLATOR TYPE SWITCHED POWER PACK

BACKGROUND OF THE INVENTION

1. Field of the Invention

The present invention is directed generally to a circuit arrangement for a free-running blocking-oscillator type switched power pack and, in particular, to a switched power pack for generating an output voltage by the clocked application of a dc-voltage to a winding of a transformer through the use of a control means for pulse-width-modulated driving of an electrical switch element. The control means bases the pulse width modulated drive on a primary current signal received at a first input post, a zero axis crossing signal received at a second input post, and a difference signal acquired from a comparitor having a first input connected to a reference voltage and a second input connected to a control voltage.

2. Description of the Related Art

A circuit arrangement is disclosed in German Published Application DE No. 33 12 209 A1 which includes a control means that, among other things, has two control signals supplied to it for pulse width modulated driving of an electrical switch element which is, for example, a thyrister or a power MOS field effect transistor. First, the control means is provided with information regarding the zero axis crossing of the switching pulses to recognize the existing frequency and the existing pulse duty ratio of the switch element. Second, this control means is supplied with a control voltage dependent upon the output voltage of the switched power pack. The control voltage is supplied through a resistor to the inverting input of a controlled gain amplifier in the form of an operational amplifier in the control means at whose non-inverting input a first reference voltage is applied. The control means is thus informed of the pulse start and of the pulse width for driving the switch element.

It has been shown in the known circuit arrangement that the operating frequency of the switched power pack rises up to its natural frequency, which is typically in the range of 150 kHz. through 200 kHz. with increasing unloading of the secondary side of the transformer. This rise in frequency leads to overheating of the switch element which can lead to the destruction thereof. To avoid having to provide a basic load at the secondary side of the switched power pack and, thus, increase dissipation of power in the standby mode, it is proposed in the known circuit arrangement to provide a capacitive switching matrix array between the input posts which receive the zero axis crossing detector signal and the control voltage. The zero axis crossing detector signal is thereby superimposed on the voltage value of the control voltage. As a result of the superimposition of the signals, a number of pulse starts for driving the switch element can be suppressed. As a consequence thereof, frequency division of the characteristic resonance of the switched power pack is achieved so that a lower operating frequency results.

However, it has turned out that at the reduced operating frequency the output voltage of the switched power pack exhibits an undesirable increase of about 10 to 20%. This is particularly disadvantageous since the output voltage is already slightly increased in the standby operating mode. A further increase of the output voltage is therefore undesirable.

SUMMARY OF THE INVENTION

It is an object of the present invention to provide an improved known circuit for a free-running blocking-oscillator type switched power pack so that any increase in the output voltage during standby operation is suppressed.

This and other objects and advantages of the invention are achieved in a switched power pack having a capacitive switching matrix array connected between two input posts of a control means to reduce the operating frequency in the standby mode and having a detector means that senses the reduction in operating frequencies at the beginning of the standby mode. The detector means is connected to a reference voltage means to vary the reference signal when the reduced frequencies are sensed during the standby mode so that the operating voltage is reduced in the standby mode.

Further, advantageous developments of the invention are realized by variation of the reference signal by approximately 20%. The detector means is preferably a frequency sensing means. In a preferred embodiment, the capacitive switching matrix array is composed of at least one series circuit composed of a resistor having a following capacitor. Such resistor is preferably a variable resistor.

In the control means, ringing suppression is provided with which transformer ringing that appears during overdrive of the transformer and the zero axis crossings of the zero axis crossing detector signal connected therewith can be suppressed. In one embodiment, the reduced operating frequency in the standby mode is set to between 15 and 60 kiloHertz.

BRIEF DESCRIPTION OF THE DRAWINGS

FIGS. 2a through 2e are voltage and current diagrams at the switching element in standby operation of 4w at the secondary side and the appertaining zero axis crossing detector signal and control voltage signal.

DETAILED DESCRIPTION OF THE PREFERRED EMBODIMENTS

Figure 1:
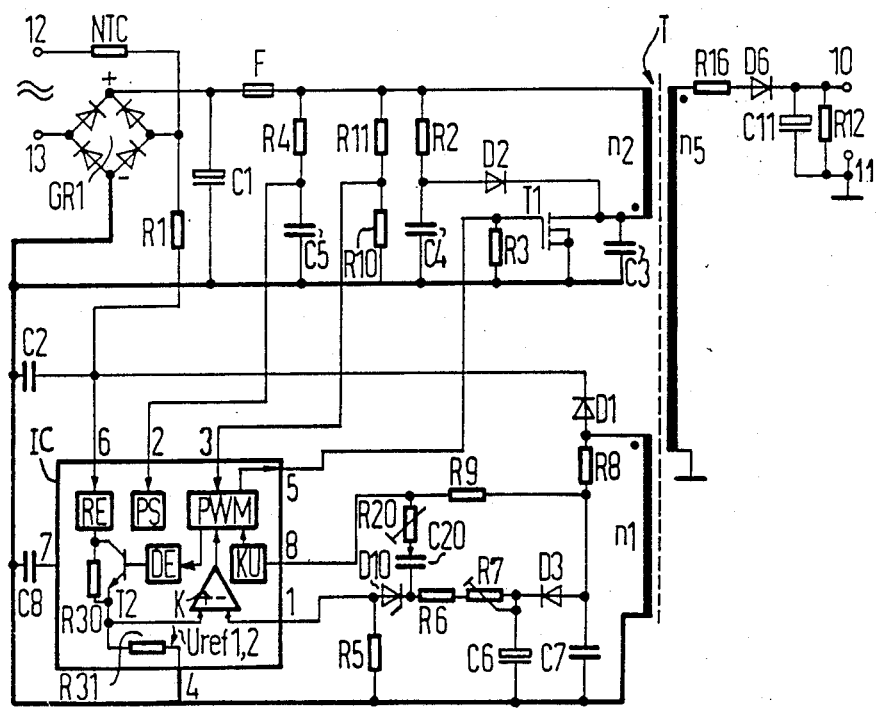
FIG. 1 is a circuit diagram of a circuit arrangement according to the principals of the present invention for a free-running blocking oscillator type switched power pack having a capacitive switching matrix array and detector means.

FIG. 1 shows a circuit arrangement for a free-running blocking oscillator type switched power pack that is similar in some aspects to that shown in Siemens Product Information "ICs für die Unterhaltung elektronik, SNTs, Edition of 8.87", page 57 for the integrated circuit TDA 4605. The power pack generates a rectified output voltage $U_A$ on outputs posts 10 and 11 of a rectifier arrangement connected at a secondary side of a transformer T. The rectifier arrangement is composed of a resistor R16, a diode D6, a capacitor C11, and a resistor R12. This circuit arrangement also includes a controllable electrical switch element T1 which is, for example, a MOS power transistor, and with which a dc voltage is applied in pulse width modulated fashion to a first winding $n_2$ at a primary side of the transformer T.

The dc voltage which the switch element T1 applies to the transformer is derived from an ac voltage of, for example, 90–270 volts applied at inputs posts 12 and 13 for the switched powered pack. The input posts 12 and 13 are followed by a bridge rectifier GR1 and a filter capacitor C1. The dc voltage produced thereby is applied between the series circuit of the load path of the switch element T1 and the first winding $n_2$ at the primary side of the transformer T.

To drive the switch element T1, the circuit arrangement includes an integrated control means IC. The control means IC is supplied with a necessary supply voltage via its terminal 6, the necessary reference voltages and switching threshold levels being defined internally in the control means IC from the supply voltage. The terminal 4 of the control means IC lies at a reference potential for the primary side of the switched power pack. The terminal 5 of the control means IC acts as an output and is connected to a control terminal of the electrical switch element T1.

For pulse width modulated drive of the switch element T1, the control means IC receives a primary current signal at a first input post, which in this case is terminal 2. A rise in the primary current at the first winding $n_2$ at the primary side of the transformer T is replicated as a voltage rise at the terminal 2 using a RC combination composed of a resistor R4 and a capacitor C5 connected in parallel across the rectified ac voltage. As will be described in greater detail hereinafter, the output pulse at the output terminal 5 is ended when a value derived from the control voltage is reached at a terminal 1.

Two further information signals are required for the exact drive of the switch element T1. At a second input post, which in this instance is terminal 8, the control means IC receives a zero axis crossing detector signal $u_{null}$ that identifies the pulse start. At the third input post, which in this case is terminal 1, the control means IC receives a control voltage $U_R$ that is dependent upon the output voltage $U_A$. This dependency is expediently accomplished by a second winding $n_1$ at a primary side of the transformer T which is permanently coupled to a winding $n_5$ at the secondary side of the transformer. The second winding $n_1$ is connected to a rectifier arrangement formed of a diode D3, a capacitor C6, a resistor R7, a resistor R6, and a resistor R5. The resistor R7 is preferably a variable resistor. Through this rectifier arrangement, the control voltage $U_R$ that is proportional to the output in voltage $U_A$ is applied to the third input terminal 1 of the control means IC. The control voltage $U_R$ is connected in the control means IC to an inverting input of a comparator amplifier K while an internal reference voltage $U_{ref}$ is applied to the non-inverting input of the comparator amplifier K. By comparing the control voltage $U_R$ acquired from the secondary winding $n_1$ to the internal reference voltage $U_{ref}$, the output pulse width and, thus, the pulse width at the output terminal 5 of the control means IC is adapted to the load at the secondary side of the power pack. After the switched power pack is started, every zero axis crossing of the feedback voltage and, thus, the zero axis crossing detector signal $U_{null}$ at the terminal 8 of the control means IC triggers an output pulse at the output terminal 5.

The natural frequency of a switched power pack of the foregoing type is typically about 150-200 kilohertz which can highly overload the switch element T1. To guarantee that the blocking oscillator type switched power pack does not oscillate at its natural frequency in standby operating mode, a capacitive switching matrix array composed of a series circuit of a resistor R20 at capacitor C20 is connected in the exemplary embodiment between the second and third input terminals 1 and 8 of the control means IC. In addition a zenor diode D10 is connected between the third input terminal 1 and the capacitor C20 for current limitation. This zenor diode, however, is not absolutely necessary but is expedient for limiting the control steepness. The capacitive connection between the terminals 1 and 8 of the control means IC enables a pulse width modulator PWM provided in the control means IC to be charged with an excessively low control voltage $U_R$ in the standby mode and also ensures that the operating frequency of the switched power pack in the standby mode can be designationally set to a low frequency of between approximately 16 to 30 kilohertz. It is, however, important that the operating of the switched power pack lie above the audible range in all circumstances so that displeasing disturbances are avoided.

The lower operating frequency of the switched power pack when in the standby mode produces a disadvantage, however, in that the output voltage $U_A$ which already rises slightly when in the standby mode is further boosted. To avoid this further boost, the circuit arrangement is expanded by a detector means DE with which the beginning of the standby mode at a reduced operating frequency is sensed. The detector means DE is connected in signal generator fashion to a reference voltage means RE and is designed so that the reference signal, which in this case is the reference voltage $U_{ref}$, is variable during the standby mode so that the output voltage $U_A$ is reduced.

In detail, the control means IC includes the pulse with modulator PWM for pulse width modulation, the pulse width modulator PWM being connected to the output terminal 5. In addition, the pulse width modulator receives a primary voltage monitoring signal applied to the input terminal 3 and also receives the following further information signals: a primary current signal from a signal relating to the primary voltage that is supplied to a primary current stage PS and that is applied to the terminal 2; zero axis crossing detector signal $U_{null}$ conducted through a ringing suppression unit KU and applied to the terminal 8; and a signal of the control voltage $U_R$ applied to the terminal 1 that is supplied to the inverting input of the comparator amplifier K, whose output is connected to the pulse width modulator PWM. A reference voltage means that is communicating width the terminal 6 produces a reference voltage $U_{ref 1,2}$ that is applied to the non-inverting input of the comparator amplifier K.

According to the present invention, the reference voltage $U_{ref 1,2}$ applied to the non-inverting input of the comparator amplifier K is switchable between at least two values. This switching occurs depending upon the operating frequency of the pulse width modulator PWM via the detector means DE which senses the beginning of the standby mode with the reduction in operating frequency of, for example, 25 kilohertz and that is connected to the output of the reference signal means RE such that the reference signal $U_{ref 1,2}$ is variable during the standby mode such that the output voltage of the switched power pack is reduced in comparison to the output voltage that is otherwise standard during the standby mode.

To this end, a switch element T2, for example is provided at the output of the detector means DE. A voltage divider composed of resistors R30 and R31 are switchable through the use of the switch element T2 such that the reference voltage $U_{ref 1,2}$ is selectable between two values. When the detector means DE is fashioned as a frequency acquisition means and when the frequency acquisition means detects the reduced operating frequency in the standby mode, then the switch element T2 in the exemplary embodiment is switched off to allow the resistor R30 to take effect. In other words, when the switch element T2 is in a non-conductive condition, current flow through the resistor R30 changes the voltage value of the reference voltage Uref1, 2. The reference voltage $_{ref}$ is reduced as a result thereof, preferably by approximately 20%. By drawing the reference voltage $U_{ref}$ toward lower values, the non-inverting input of the comparator amplifier K is supplied with a lower reference voltage and the output signal applied at the output of the comparator amplifier K is thereby increased. This results in the reduction of the output voltage of the blocking oscillator type switched power pack.

When, for example, the ringing suppression unit KU is arranged between the pulse width modulator PWM and the second input terminal 8 in the circuit arrangement of the invention and when the resistor R20 of the capacitive switching matrix array is a variable resistor, then the standby frequency of the switched power pack can initially be set to a frequency, of, for example, 25 kilohertz.

The operation of the switched power pack of the present invention will now be explained with reference to FIGS. 2a through 2e. The signals of FIGS. 2a through 2e are present during the operation of the illustrated circuit arrangement and are shown in terms of their chronological dependency upon one another. FIG. 2a shows a voltage $U_D$ across the switch element T1, while FIG. 2b shows the current $I_D$ through the switch element T1. In FIG. 2c is shown a voltage $U_{null}$ which is the zero axis crossing detector signal applied to the second input terminal 8.

The zero axis crossing detector signal $u_{null}$ is likewise derived from the second transformer winding $n_1$ at the primary side of the transformer T by resistors R8 and R8 connected to the second input terminal 8 of the integrated control means IC. A voltage $U_{C6}$ in FIG. 2d indicates the control voltage at the capacitor C6. FIG. 2e shows voltage $U_{RC}$ which is the differentiated zero axis crossings over the capacitive switching matrix array composed of the series circuit of the resistor R20 and the capacitor C20.

Due to the wiring of the terminals 1 and 8 of the control means IC, the operating frequency of the switched power pack in the standby mode is limited to about 25 kilohertz. This low frequency is achieved because of number of the zero axis crossings of the zero crossing detector signal $U_{Null}$ are ignored. This occurs as a result of the capacitive switching matrix array that simulates an excessively low control voltage for the control means IC during the standby mode, so that the current pulse arising at the switch element T1 ends up relatively high. The comparator amplifier K contained in the control means IC is greatly overdriven with the transformer discharge resulting therefrom. The next pulse is not enabled until a decay in the voltage.

This solid signal curves shown in FIG. 2a, 2c, and 2d show the signals from an unmodified reference signal, while the broken line curves are the result of a 20% reduction in the reference signal during the standby mode.

Thus, a reliable operation of the circuit arrangement is guaranteed even with low power consumption and, in an exemplary embodiment, the dissipated power in the standby mode is only a few watts. This is a result of the detector means DE with whose assistance the internal reference voltage of the control means IC is reduced during the standby mode in addition to the capacitive coupling of the two input posts 1 and 8. As a result, a rise in the output voltage that is undesirable in the standby mode and that is further boosted by the capacitive coupling is effectively avoided.

Although other modifications and changes may be suggested by those skilled in the art, it is the intention of the inventors to embody within the patent warranted hereon all changes and modifications as reasonably and properly come within the scope of their contribution to the art.

We claim:

1. A circuit arrangement for a free-running blocking-oscillator-type switched power pack for generating an output voltage, comprising:
   a transformer having a first winding;
   an electrical switch element connected said first winding of said transformer;
   a control means for pulse width modulated driving of said electrical switch element to cause a clocked application of a DC voltage to said first winding of said transformer, said control means having:
      a first input post connected for receiving at least one primary current signal;
      a second input post connected to receive a zero-axis crossing signal which identifies a pulse start,
      a comparator amplifier operable to produce a difference signal that defines a pulse width, said comparator amplifier having first and second control inputs;
   a reference voltage means for forming an internal reference signal, said reference voltage means being connected to supply said internal reference signal to said first control input of said comparator amplifier;
   a third input post connected to receive a control voltage that is dependent upon said output voltage, said third input post being connected to supply said control voltage to said second control input of said comparator amplifier;
   a capacitive switching matrix array connected between said second and third input posts, said matrix array causing a reduction in operating frequency in standby mode for the circuit arrangement; and
   a detector means for sensing a beginning of the standby mode by a reduction in the operating frequency, said detector means being connected to said reference voltage means to reduce said reference signal during the standby mode.

2. A circuit arrangement as claimed in claim 1, wherein said detector means varies said reference signal by approximately 20%.

3. A circuit arrangement as claimed in claim 1, wherein said detector means is a means for sensing frequency.

4. A circuit arrangement as claimed in claim 1, wherein said capacitive switching matrix array is formed of at least one series circuit of a resistor and a capacitor.

5. A circuit arrangement as claimed in claim 4, wherein said resistor is a variable resistor.

6. A circuit arrangement as claimed in claim 1, wherein said control means further includes:

a ringing suppression unit operable to suppress transformer ringing when said transformer is overdriven, said ringing suppression unit being connected to receive said zero axis crossing detector signal.

7. A circuit arrangement as claimed in claim 1, wherein the reduced operating frequency in the standby mode is set to between approximately 15 to 60 kilohertz.

* * * * *